US006954406B2

(12) United States Patent
Jones

(10) Patent No.: US 6,954,406 B2
(45) Date of Patent: Oct. 11, 2005

(54) ACOUSTICAL SOURCE AND TRANSDUCER HAVING, AND METHOD FOR, OPTIMALLY MATCHED ACOUSTICAL IMPEDANCE

(76) Inventor: Joie P. Jones, 2094 San Remo Dr., Laguna Beach, CA (US) 92651

( * ) Notice: Subject to any disclaimer, the term of this patent is extended or adjusted under 35 U.S.C. 154(b) by 0 days.

(21) Appl. No.: 10/793,311

(22) Filed: Mar. 3, 2004

(65) Prior Publication Data

US 2004/0174772 A1 Sep. 9, 2004

Related U.S. Application Data

(60) Provisional application No. 60/452,173, filed on Mar. 4, 2003.

(51) Int. Cl.[7] .................................................. H04N 2/00
(52) U.S. Cl. ....................................................... 367/152
(58) Field of Search ......................... 367/152; 310/328; 73/644; 600/472

(56) References Cited

U.S. PATENT DOCUMENTS 4,211,948 A * 7/1980 Smith et al. ................ 367/152
6,311,573 B1 11/2001 Bhardwaj

FOREIGN PATENT DOCUMENTS

GB 2035010 * 6/1980 .......... G01N/29/00
WO WO 98/58519 12/1998

OTHER PUBLICATIONS

Kinsler, Lawrence E., Frey, Austin R., Coppens, Alan B., and Sanders, James V., *Fundamentals of Acoustics*, 1982, Third Edition, pp. 127–131, John Wiley and Sons.

Frederick, Julian R., *Ultrasonic Engineering*, 1965, pp. 284–285, John Wiley & Sons.

Lynnworth, Lawrence C., *Ultrasonic Measurements for Process Control, Theory , Techniques, and Applications*, 1989, pp. 123–126, Academic Press, Inc.

Cho, Z.H., Jones, Joie P., Singh, Manbir, *Foundations of Medical Imaging*, 1993, pp. 477–487, John Wiley and Sons.

Carnevale, E.H., Wolnik, S., Larson, G., Carey, C., and Wares, G., "Simultaneous Ultrasonic and Line Reversal Temperature Determination In a Shock Tube," *The Physics of Fluids*, Jul. 1967, vol. 10, No. 7, pp. 1459–1467.

Fox, F.E., Khuri–Yakub, B.T., Kino, G.S., "High–Frequency Acoustic Wave Measurements in Air," 1983 Ultrasonics Symposium sponsored by the IEEE group, Oct. 31–Nov. 2, 1983, pp. 581–584, vol. 1, IEEE Press.

Khuri–Yakub, B.T., Kim, J.H., Chou, C.H., Parent, P., and Kino, G.S., "A New Design for Air Transducers," 1988 Ultrasonics Symposium, 1988, pp. 503–506, IEEE Press.

Desilets, Charles S., Fraser, John D., Kino, Gordon S., The Design of Efficient Broad–Band Piezoelectric Transducers, *IEEE Transactions on Sonics and Ultrasonics*, May 1978, pp. 115–125, vol. SU–25, No. 1.

Fry, William J., and Dunn Floyd, "Ultrasonics Intensity Gain by Composite Transducers,"*The Journal of the Acoustical Society of America*, Feb. 1962, pp. 188–192, vol. 34, No. 1–6.

Silk, M.G., *Ultrasonic Transducers for Nondestructive Testing*, 1984, pp. 15–20 and pp. 67–72, Adam Hilger, LTD., Bristol.

Deka, M, "Air–Coupled Ultrasonic Transducer for NDE," 1987 Ultrasonics Symposium, 1987, pp. 543–546, IEEE Press.

* cited by examiner

*Primary Examiner*—Daniel Pihulic
(74) *Attorney, Agent, or Firm*—Michael Blaine Brooks, P.C.; Michael B. Brooks

(57) ABSTRACT

The invention, in its several embodiments, includes a method of making a plurality of impedance-matched layers interposed between an acoustical source and a target media providing optimal transmission of energy from the acoustical source to the target media.

8 Claims, 3 Drawing Sheets

ACOUSTICAL SOURCE AND TRANSDUCER HAVING, AND METHOD FOR, OPTIMALLY MATCHED ACOUSTICAL IMPEDANCE

This application claims the benefit of U.S. Provisional Application No. 60/452,173, filed Mar. 4, 2003, to Joie P. Jones entitled, "ULTRASONIC TRANSDUCER HAVING, AND METHOD FOR, OPTIMALLY MATCHED ACOUSTICAL IMPEDANCE," the disclosure of which, including all appendices and all attached documents, is hereby incorporated herein by reference in its entirety for all purposes.

BACKGROUND—FIELD OF THE INVENTION

The present invention relates generally to acoustical sources and ultrasonic transducers and particularly to ultrasonic transducers having optimally matched acoustical impedance and methods of achieving optimal acoustical impedance matching for such devices.

BACKGROUND—STATE OF THE ART

When an acoustical source transmits a signal into a target material, much of the energy is lost when there is an acoustical mismatch between the source and the target. For example, in medical ultrasonics, a typical piezoelectric ultrasonic source, such as a transducer, has an acoustical impedance of about $34\times10^6$ Kg/m$^2$·s while the human body, in this case the target, has an acoustical impedance similar to water which is $1.5\times10^6$ Kg/m$^2$·s. As is known in the art, the energy reflection coefficient is given by the difference in the two impedances divided by the sum of the two impedances and then the resulting quantity is squared. Such an acoustical mismatch results in approximately 84% of the energy being reflected at the tissue-transducer interface. For the above example, the energy reflection coefficient is about 0.84, which means that about 84% of the incident energy will be reflected. This serious problem is overcome by placing what is known as a "quarter-wavelength matching layer" between the tissue and the transducer. Such a layer, mounted to the face of the piezoelectric crystal, has an acoustic impedance that is the geometrical mean of the impedances of the source and the target tissue and has a thickness that is equal to a multiple of a quarter-wavelength of the acoustical wave in the matching layer. Symbolically, let $Z_0$ represent the acoustical impedance of the piezoelectric crystal and $Z_2$ represent the acoustical impedance of the target tissue. Then the impedance of the matching layer, $Z_1$, is given by $$Z_1=(Z_0Z_2)^{1/2}. \qquad [1]$$

The thickness of the matching layer, $L_1$, is given by $$L_1=(2n-1)\lambda_1/4, \qquad [2]$$

where $\lambda_1$ is the wavelength of sound in medium 1 and n is an integer.

The theoretical basis for a quarter wavelength matching layer is well known in the art and well described in the acoustical literature, the literature associated with ultrasonic engineering, and the literature associated with medical imaging, representing a solution to a classical boundary value problem in acoustics in which a plane wave travels from one medium into another though an intermediate layer. The solution to this boundary value problem is such that if the intermediate layer meets the conditions of Equations 1 and 2, then 100% of the energy propagating in the first medium will be transmitted into the second. Although this analytical result is strictly valid for only a single frequency, experimental results reported in the field have shown that even broad-band devices with a wide spectrum of frequencies greatly benefit from the use of such a matching layer.

The quarter wavelength matching layer provides a viable solution if the mismatch in impedances is not too large. For example, in the medical ultrasonics case given above Equation [1] yields a matching layer impedance of about $7\times10^6$ Kg/m$^2$·s. This impedance is known to practitioners in the field to be well within the range of several rubber and plastic materials that could be used for a matching layer. Such single layer matching layers are widely used today in medical and industrial applications of ultrasound.

If, on the other hand, the mismatch in impedances between the two materials is large, the quarter-wavelength matching layer no longer provides a practical solution. For example, if it is desired to match a typical piezoelectric transducer having an impedance of $34\times10^6$ Kg/m$^2$·s to air having an impedance of 415 Kg/m$^2$·s, then, using the relationship represented by Equation 1, a single matching layer would be required having an impedance of $0.12\times10^6$ Kg/m$^2$·s. Unfortunately, no appropriate materials that have the required impedance are known in the field and so some other approach is required.

While there are several proposed approaches to practically improve the state of the art in acoustically matching two materials having disparate impedances, they all prove to be ad hoc and inefficient in energy transmission. The state of the art includes the use of a thin, approximately 10 microns in thickness, taut plastic film in which an air film is entrapped to cover the dry flat face of a 100 kHz transducer. A 10-dB gain is reported for this approach without sacrifice of response bandwidth. A different approach adds microscopic balloons to epoxy to create a low impedance matching material for the front face of a transducer. Improvements were reported for this case to frequencies as high as 1 MHz. The state of the art approaches typically include a special rubber material that, when fabricated into a quarter-wave layer, overcomes some of the transducer-to-air mismatch and a two-layer matching layer in which the best second layer is found when the first layer is not optimal. Typically, first layers consist of a rubber (e.g., GE RTV615) containing air bubbles 50 microns in diameter. One such approach has an optimization criteria for a two layer matching layer in which the impedance steps monotonically from the source to the target. Although still not an optimal match, this method appears to provide broader bandwidth performance over the preceding approaches. Another proposal has a non-monotonic multi-layer matching layer that proves to be useful only for narrow-band matching. In another approach, many thin layers of progressively increasing, or decreasing, impedance form, in a combined sense, the matching layer. In this approach, layers as small as 1/30 of a wavelength make up the total matching layer. One approach uses multiple layers of readily available materials to approximately match 450 kHz transducers into air for non-contact non-destructive testing of steel. Finally, in the U.S. Pat. No. 6,311,573 issued to Mahesh Bhardwaj Nov. 6, 2001, there is described a matching layer, consisting of several layers, in which a standard piezoelectric transducer is approximately matched to air. In a typical example, the piezoelectric lead-zirconate-titanate (PZT) member is coated with aluminum, hard epoxy, and finally with clay-coated paper. Using Bhardwaj as a representative of the state of the art, Bhardwaj provides several ad hoc examples of matching a piezoelectric such as PZT to air. Bhardwaj describes in his Example 1 (col. 4, lines 38–57).

"A 1 MHz transducer may be constructed as follows:

Piezoelectric material: PZT.Z1=34×106 Kg/m$^2$·s;

First transmission layer: aluminum. V=6325 m/s. Z2=17×106 Kg/m$^2$·s; P/8 @ 1 MHz=1000/8=125 ns, where 1000 ns is one period, P, for the MHz frequency. Therefore, thickness of this layer is 125×10−9×6,325,000=0.79 mm.

Second transmission layer: hard epoxy. V=2600 m/s. Z3=3×106 Kg/m$^2$·s P/16 @ 1 MHz=1000/16=62.5 ns. Therefore, thickness of this layer is 62.5×10−9×2,600,000=0.16 mm. Facing layer: clay-coated paper. V=500 m/s. Z4=0.6×106 Kg/m$^2$·s; P/16 @ 1 MHz=1000/16=62.5 ns. Therefore, thickness of this layer is 62.5×10−9×500,000=0.03 mm."

In this particular example, three matching layers are used to match PZT with air. Table I below summarizes the impedance of this method where less than 20% of the energy is transferred from the PZT to air.

TABLE I

| | Impedance (Kg/m$^2$ · s) |
|---|---|
| Source: $Z_0$ (PZT) | $34 \times 10^6$ |
| First Layer: $Z_1$ | $17 \times 10^6$ |
| Second Layer: $Z_2$ | $3 \times 10^6$ |
| Third Layer: $Z_3$ | $0.6 \times 10^6$ |
| Target Medium: $Z_5$ (air) | 415 |

Bhardwaj's Example 2 (col. 5, lines 1–16) has

"A transducer according to this invention with a multi-part transmission layer might be constructed of the following layers:

piezoelectric layer (PZT) 34×106 Kg/m$^2$·s aluminum layer 17×106 Kg/m$^2$·s aluminum composite layer 7×106 Kg/m$^2$·s epoxy layer 3×106 Kg/m$^2$·s paper facing layer 0.3×106 Kg/m$^2$·s"

Here four layers are used to match PZT to air. Table II below summarizes the impedances of Bhardwaj's Example 2 where the energy transferred is less than 20%.

TABLE II

| | Impedance (Kg/m$^2$ · s) |
|---|---|
| Source: $Z_0$ (PZT) | $34 \times 10^6$ |
| First Layer: $Z_1$ | $17 \times 10^6$ |
| Second Layer: $Z_2$ | $7 \times 10^6$ |
| Third Layer: $Z_3$ | $3 \times 10^6$ |
| Fourth Layer: $Z_4$ | $0.3 \times 10^6$ |
| Target Medium: $Z_5$ (air) | 415 |

The above methods were all experimentally derived in an ad-hoc manner without any fundamental basis or analytical framework. There remains a need for manufacturing transducers and other acoustical sources consistently having optimal solutions to the matching between source and target impedances.

SUMMARY

The invention, in its several embodiments, includes a method of making a transducer having a plurality of impedance matched layers including the steps of providing a piezoelectric element having a source impedance, $Z_0$; selecting a target medium having a target impedance, $Z_{(N+1)}$; defining a number of matching layers, N, wherein N is an integer greater than unity; and for each matching layer, J, incremented 1 to the defined number of matching layer, N: determining a required impedance according to a solution to the boundary value problem for N layers; selecting a material for matching layer J having substantially the determined required impedance $Z_J$ wherein the selected material for matching layer J has a speed of sound and a wavelength $\lambda_J$ associated with the speed of sound for matching layer J; determining a positive integer value, $n_J$, and a thickness, $L_J$, of the selected material for matching layer J and applying the matching layer J of thickness $L_J$ to the transducer.

The method of making a transducer having a plurality of impedance matched layers also includes: producing acoustical pressure by an acoustical source in a first medium having an acoustical impedance; measuring, by a receiving transducer, the acoustical pressure produced by the acoustic source in the first medium; producing acoustical pressure by the acoustical source in a second medium having an acoustical impedance; measuring, by the receiving transducer, the acoustical pressure produced by the acoustical source in the second medium; and determining the derived effective source impedance based upon the acoustical impedance of the first medium, the acoustical impedance of the second medium, the acoustical pressure in the first medium measured by the receiving transducer, and the acoustical pressure in the second medium measured by the receiving transducer.

BRIEF DESCRIPTION OF THE DRAWINGS

For a further understanding of the nature and objects of he present invention, reference should be made to the following detailed description, taken in conjunction with the accompanying drawings, in which like elements are given the same or analogous reference numbers and wherein.

DETAILED DESCRIPTION

Figure 1:
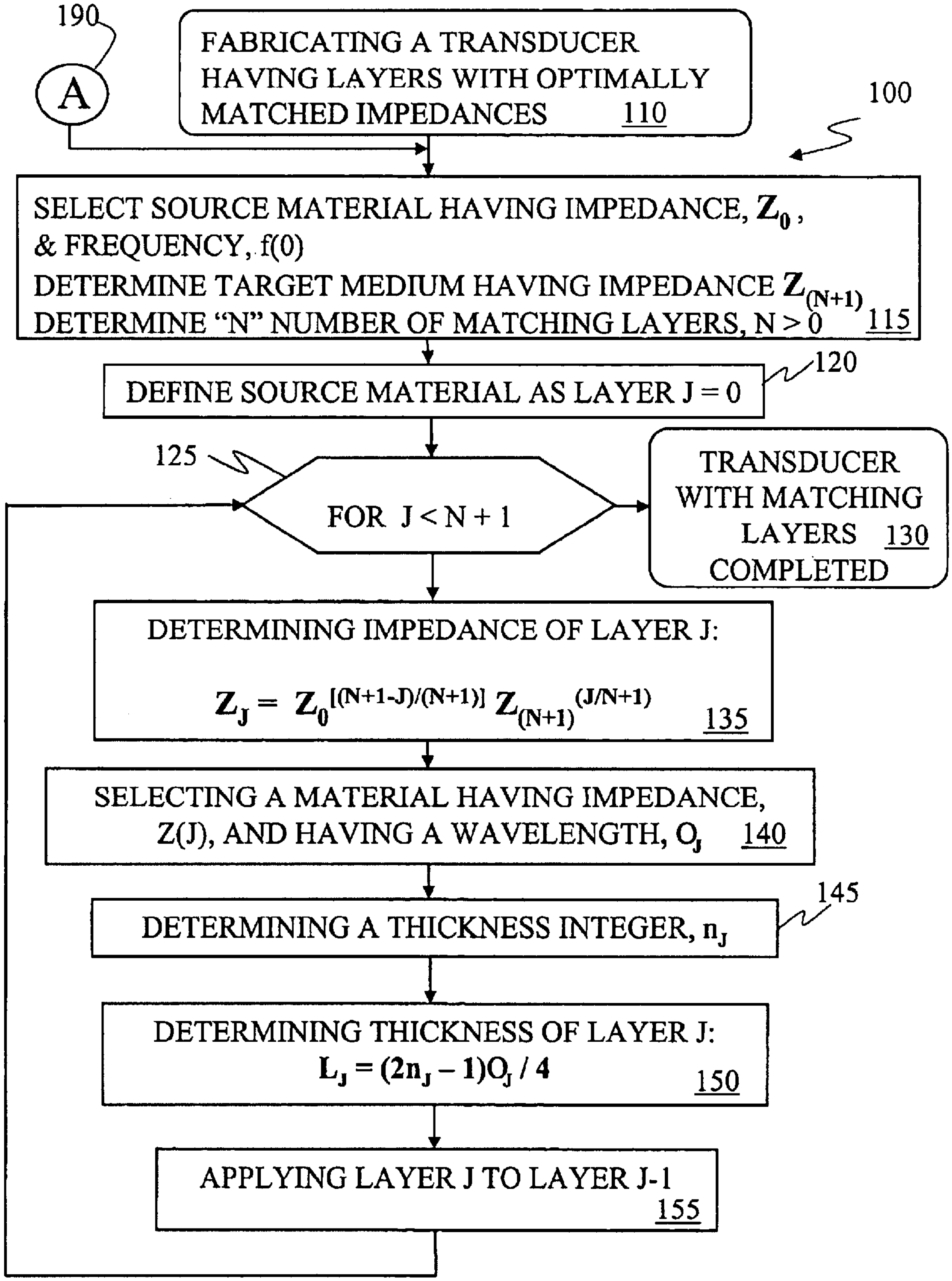
FIG. 1 is a flowchart describing the preferred method embodiment of the present invention.

The present invention in its several embodiments includes transducers having matching layers optimally matched in impedance and methods of achieving the optimal matches. Each of the following examples, whether describing an interstitial media comprised of one layer or several layers, describe interstitial media having an optimal match in impedances between a transducing source and a target medium. In practice, the number of layers chosen depends on the range and values of impedances desired for a particular implementation. The preferred method of establishing optimal multiple matching layers extends the approaches relying on the original boundary value problem formulation typically used for one layer. The methods and resulting products disclosed below are for matching layers where the solved boundary value problem provides for optimal solutions for two or more interposed layers and the method is extendable to N layers. The impedance values generated for each layer are optimal and when used to guide the material selection, provide for maximal energy transmission from the transducing source.

In case 1, a single layer is interposed between the source layer having an impedance, $Z_0$, and a target medium having an impedance, $Z_2$. The required impedance, $Z_1$, of the matched layer is determined by generating the product of the square roots of the impedance of $Z_0$ and a having an impedance $Z_2$ of the target medium. That is, $$Z_1=(Z_0Z_2)^{1/2}. \quad [3]$$

In case 2, two layers are interposed between the source layer having an impedance, $Z_0$, and a target medium having an impedance, $Z_3$. The required impedance of the matched first layer, $Z_1$, is determined by generating the product of the square of the cube root of the source impedance of $Z_0$ and the cube root of the target medium impedance $Z_2$. That is, $$Z_1=Z_0^{2/3}Z_3^{1/3}. \quad [4]$$

Similarly, the required impedance of the matched second layer, $Z_2$, is determined by generating the product of the cube root of the source impedance, $Z_0$, and the square of the cube root of the target medium impedance, $Z_3$. That is, $$Z_2=Z_0^{1/3}Z_3^{2/3}. \quad [5]$$

In case 3, three layers are interposed between the source layer having an impedance, $Z_0$, and a target medium having an impedance, $Z_4$. The required impedance of the matched first layer, $Z_1$, is determined by generating the product of the source impedance of $Z_0$ raised to the ¾-power and the target medium impedance $Z_4$ raised to the ¼-power. That is, $$Z_1=Z_0^{3/4}Z_4^{1/4}. \quad [6]$$

Similarly, the required impedance of the matched second layer, $Z_2$, is determined by generating the product of the square root of the source impedance, $Z_0$, and the square root of the target medium impedance, $Z_4$. That is, $$Z_2=Z_0^{1/2}Z_4^{1/2}. \quad [7]$$

Likewise, the required impedance of the matched third layer, $Z_3$, is determined by generating the product of the source impedance of $Z_0$ raised to the ¼-power and the target medium impedance $Z_4$ raised to the ¾-power. That is, $$Z_3=Z_0^{1/4}Z_4^{3/4}. \quad [8]$$

In case 4, four layers are interposed between the source layer having an impedance, $Z_0$, and a target medium having an impedance, $Z_5$. The required impedance of the matched first layer, $Z_1$, is determined by generating the product of the source impedance of $Z_0$ raised to the ⅘-power and the target medium impedance $Z_5$ raised to the ⅕-power. That is, $$Z_1=Z_0^{4/5}Z_5^{1/5}. \quad [9]$$

Similarly, the required impedance of the matched second layer, $Z_2$, is determined by generating the product of the source impedance of $Z_0$ raised to the ⅗-power and the target medium impedance $Z_5$ raised to the ⅖-power. That is, $$Z_2=Z_0^{3/5}Z_5^{2/5}. \quad [10]$$

Likewise, the required impedance of the matched third layer, $Z_3$, is determined by generating the product of the source impedance of $Z_0$ raised to the ⅖-power and the target medium impedance $Z_5$ raised to the ⅗-power. That is, $$Z_3=Z_0^{2/5}Z_5^{3/5}. \quad [11]$$

Finally, the required impedance of the matched fourth layer, $Z_4$, is determined by generating the product of the source impedance of $Z_0$ raised to the ⅕-power and the target medium impedance $Z_5$ raised to the ⅘-power. That is, $$Z_4=Z_0^{1/5}Z_5^{4/5}. \quad [12]$$

Generally, the method of generating impedances for N layers, where N is a positive integer, interposed between the source layer having an impedance $Z_0$, and the target medium having an impedance $Z_{N+1}$, the impedance required for each successive interposed layer J, where J is an integer ranging from 1 to N, is generated as follows:

$$Z_J=Z_0^{[(N+1-J)/(N+1)]}Z_{(N+1)}^{(J/N+1)}. \quad [13]$$

A separate set of procedures, similar to those for a single matching layer, determines the optimal thickness of the matching layers to insure maximum energy transfer across the matching layer. If the thickness of matching layer J is given by $L_J$ and $\lambda_J$ is the wavelength of sound in layer J, then $$L_J=(2n_J-1)\lambda_J/4 \quad [14].$$

where $n_J$ is a positive integer that is preferably selected as unity, two or three in a balance between structural requirements and parasitic effects of the material. The single matching layer solution is consistent with the case of a single matching layer described by Equation 2. The combination of the above procedures is an example method 100 of making an acoustic transducer, or acoustical resonating source, having layers of optimally matched impedances is illustrated in FIG. 1. Preliminary selections and determinations 115 are made where the transducing, acoustical resonating, source material is selected having an impedance Z(0) and a resonance frequency, f(0). The target medium is determined and with it, its impedance Z(N+1). The number of matching layers, N, is determined. For purposes of iteration 125, the source material can be defined as layer J=0 120. For each matching layer, the impedance of the matching layer is determined 135 from $$Z_J=Z_0^{[(N+1-J)/(N+1)]}Z_{(N+1)}^{(J/N+1)}; \quad [15]$$

The next step is selecting a material having the determined impedance Z (J) and having a wavelength, $\lambda_J$, where the wavelength is determinable from the speed of sound of the material and the piezoelectric resonant frequency of operation, f(0) 140. With the material selected and its structural and fabrication qualities known, the thickness integer, n(J) is determined 145. The thickness of the particular layer J is then determined 150. The material of layer J is then applied to the subsequent layer 155 where the piezoelectric medium is treated as layer 0. The example method described is applicable to acoustical sources in addition to ultrasonic transducers. In those applications, an effective source impedance is determined according to steps disclosed below and the resulting effective source impedance replaces 190 the known transducer impedance Z(0) 115.

Figure 2:
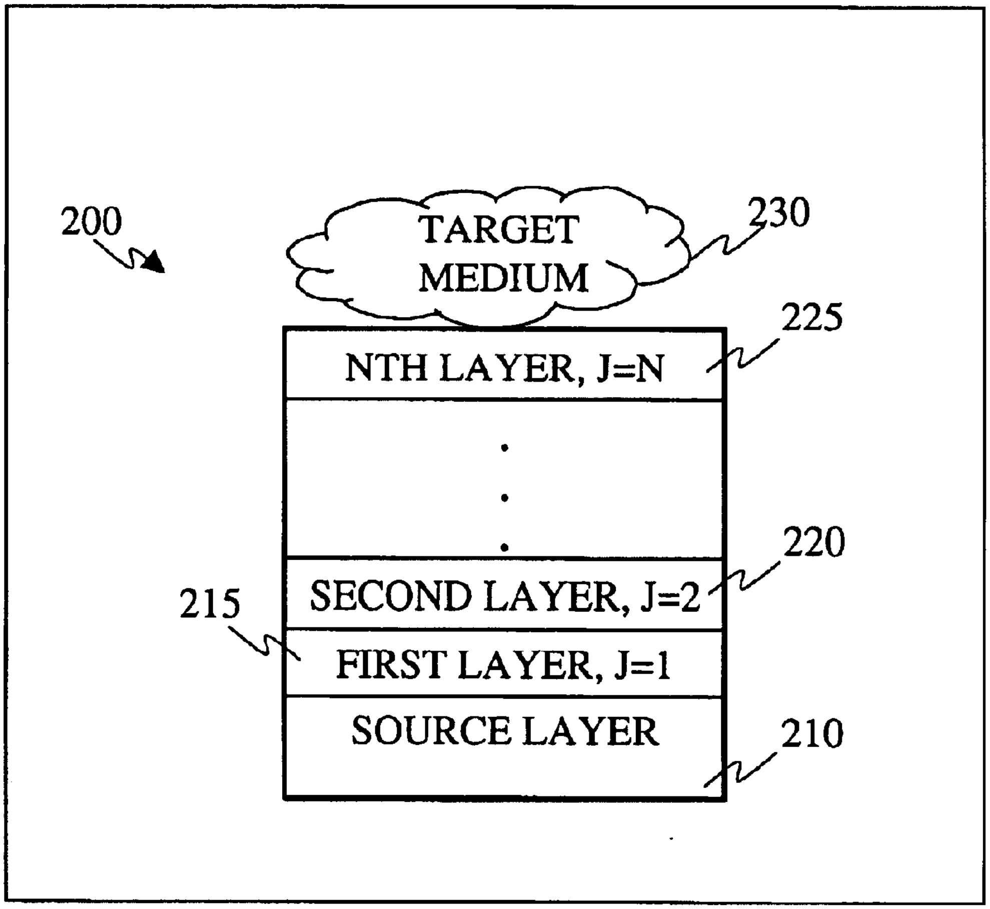
FIG. 2 illustrates an example layered transducing device embodiment according to the present invention.

The following examples illustrate the application of the above-disclosed method in its several embodiments to making ultrasonic transducers having optimally matched acoustical impedances where the resulting transducer is illustrated by example in FIG. 2. The transducer 200 is comprised of a PZT source layer in the preferred embodiment 210, whereupon a first layer 215, a second layer 220 and, if needed, successive layers up to the Nth layer 225 are applied in accordance with the teachings of the present invention so that the acoustical energy generated at the source 210 is efficiently transmitted to the target medium 230 due to the interstitial layers having optimally matched impedances.

First, in an application to the general case of matching a typical piezoelectric such as PZT to air, the piezoelectric has an example impedance of $34\times10^6$ Kg/m$^2$·s and the target medium, air for this example, has an impedance of 415 Kg/m$^2$·s. In fabricating a transducer with a single matching layer using Equation 1, the matching layer would be required to have an impractical impedance of $0.12\times10^6$ Kg/m$^2$·s. In fabricating a transducer with two matching layers then, using the teachings of the preferred method disclosed, one calculates that the first matching layer should be $0.78\times10^6$ Kg/m$^2$·s and the second matching layer should be $0.018\times10^6$ Kg/m$^2$·s. Selecting matching layer materials meeting these specifications insures an optimal configuration and that the maximal amount of energy will be transmitted into the target.

It should be clear to practitioners in the field that, from the above example, increasing the number of matching layers increases the range of materials one may use in constructing an optimal transducer. For example, matching PZT to air using a single matching layer requires a matching layer with an impedance of $0.12\times10^6$ Kg/m$^2$·s. Unfortunately, a material that seems to have the appropriate acoustical impedance is cork which also is very absorptive and therefore inappropriate for most practical applications. However, in fabricating a transducer with two matching layers, one may choose materials with impedances of $0.78\times10^6$ Kg/M$^2$·s and of $0.018\times10^6$ Kg/m$^2$·s such as those of various forms of rubber which are materials that also have low attenuation coefficients whereby such materials provide a practical means of matching PZT to air.

In an example where three matching layers are applied to the present invention, PZT is matched with air. Table III below summarizes the results of the example method where the energy transferred is nearly 100%.

TABLE III

| | Impedance (Kg/m$^2$ · s) |
|---|---|
| Source: $Z_0$ (PZT) | $34 \times 10^6$ |
| First Layer: $Z_1$ | $2 \times 10^6$ |
| Second Layer: $Z_2$ | $0.12 \times 10^6$ |
| Third Layer: $Z_3$ | $0.007 \times 10^6$ |
| Target Medium: $Z_5$ (air) | 415 |

In the following example, four layers are used to match PZT to air. The table below summarizes the results of the preferred method of the present invention where nearly 100% of the energy is transferred.

TABLE IV

| | Impedance (Kg/m$^2$ · s) |
|---|---|
| Source: $Z_0$ (PZT) | $34 \times 10^6$ |
| First Layer: $Z_1$ | $3.5 \times 10^6$ |
| Second Layer: $Z_2$ | $0.37 \times 10^6$ |
| Third Layer: $Z_3$ | $0.038 \times 10^6$ |
| Fourth Layer: $Z_4$ | $0.004 \times 10^6$ |
| Target Medium: $Z_5$ (air) | 415 |

The methods described above provide an effective and efficient means to match the acoustical impedances between two materials and thereby provide for the fabrication of ultrasonic transducers having optimally matched acoustical impedance. The ultrasonic transducers fabricated according to the teachings of this description provide for maximal energy transfer from the source of transduction to the target medium. Although the method, in its several embodiments, described here provides an optimal acoustical impedance match between any two materials for a specified number of layers, it is instructive to consider the matching of a typical piezoelectric such as PZT to air as described in the examples given above. Disclosed are several specific implementations of the general method. As above, the PZT has an acoustical impedance of $34\times10^6$ Kg/m$^2$·s and the air has an impedance of 415 Kg/m$^2$·s. If a single matching layer is used, then the method reduces to the well known classical result described by Equations 1 and 2. For this case as shown above, the matching layer would have an impedance of $0.12\times10^6$ Kg/m$^2$·s. As indicated above, cork is one of the few materials with such impedance. However, since this material is highly absorptive, i.e., a great deal of acoustical energy will be lost, it is a poor candidate for a matching layer.

In moving to two matching layers as shown above, we have impedances of $0.78\times10^6$ Kg/m$^2$·s and $0.018\times10^6$ Kg/m$^2$·s. Various forms of rubber are known to be fabricated to have such impedances. For example, hard rubbers can be constructed with an impedance of about 0.78×106 Kg/m2×s, a sound speed of about 2400 m/s, and a wavelength at 1 MHz of 2.4 mm. The matching layer fabricated from this material could be as small as a quarter of a wavelength, i.e., $n_J$=1, or 0.6 mm in thickness. Soft rubbers can be constructed with an impedance of about 0.018×106 Kg/m2×s, a sound speed of about 1050 m/s, and a wavelength at 1 MHz of about 1 mm. The matching layer fabricated from this material could be as small as a quarter of a wavelength or 0.25 mm in thickness.

Moving to four matching layers, as described in the above Table IV, the following materials can be used:

For the first layer, various forms of PLEXIGLAS® and TEFLON® are applicable for example to yield 3.5×106 Kg/m2·s; for the second layer, soft rubber yields 0.37×106 Kg/m2·s; for the third layer, forms of soft rubber yield 0.038×106 Kg/m2·s; and for the fourth layer, paper and forms of soft rubber yield 0.004×106 Kg/m2·s.

The thickness of each matching layer is determined by Equation 14 with the matching layer thickness integer, $n_J$, selected for each layer, J, for benefits including energy transfer efficiency and improved manufacturability.

The transducer example of the present invention is preferably a PZT device having a peak or resonant frequency where the preferred embodiment has one or more layers of soft rubber and/or one or more layers of hard rubber painted onto either the transducer surface or a successive matching layer. The application of the rubber continues until a desired thickness of one-quarter wavelength where the wavelength is as defined as the speed of sound in the rubber divided by the resonant frequency of the piezoelectric element, see Equation 14. In addition to hard rubber painting, alternative embodiments have matching layers bonded to each other with conventional epoxies and cements and self-adhesive tape or other high viscosity epoxy, glue or cement.

Where it is not practicable to fabricate the material for matching layers to one-quarter wavelength or not desirable to fabricate the material to as low as one-quarter wavelength due to structural requirements, then a matching layer thickness integer, n, greater than one must be used. Where, for example n is 2, the matching layer is three-fourths of a wavelength. It is clear to those skilled in the art that by this disclosure, one can establish a resulting fabrication target total thickness of matching layers expressed approximately in wavelengths of similar but not necessarily identical material. That is, where $\lambda_1$ is approximately equal to $\lambda_2$, two one-quarter-wavelength matching layers maybe combined to achieve a one-half wavelength target thickness. In doing so, one may approximately achieve a combined thickness of one-half wavelength, $\lambda_1/2$. This method of targeting the thickness extends to higher target thickness as well. For example, a target thickness of $3\lambda_2/2$ may be desired where the first thickness is $5\lambda_1/4$ and the second thickness is $\lambda_2/4$, thereby yielding, for $\lambda_1$ approximately equal to $\lambda_2$, a combined thickness of $3\lambda_1/2$.

While PZT, i.e., lead zirconate titanate, is the preferred material for the ultrasonic transducer or source, the method, in its several embodiments, is applicable to any piezoelectric material as the source material. Alternate materials include quartz, barium titanate, lithium sulfate, lithium niobate, lead meta-niobate as well as other suitable electromechanical coupling agents. For the target medium, air and other gaseous media are anticipated to be the most common targets; however, liquids, including water and water-like media, as well as solids, including tissue and tissue-like materials, may also be targeted.

Although the examples given above are representative of piezoelectric devices operating in the MHz range of frequencies, those skilled in the art will recognize that the method is applicable to any piezoelectric transducer operating over any range of frequencies. This would include piezoelectric transducers operating in the kHz frequency range and even lower, as well as piezoelectric transducers fabricated using semiconductor techniques, deposition methods, and/or nano-technology methods, and operating in the megahertz (MHz), gigahertz (GHz), and the terahertz (THz) frequency ranges.

Although the method as described by example address piezoelectric devices, those skilled in the art recognize that the method, in its several embodiments, is applicable to any acoustical source or ultrasonic transducer, regardless of the technique by which the acoustical wave is generated, provided that the effective acoustical impedance, $Z_{EFF}$, as defined below, is measured for the acoustical source in question, and that the acoustical impedance of the source, $Z_0$, in the above analysis is replaced by $Z_{EFF}$. The measurement of what we define as the effective acoustical impedance for an acoustical source enables the method detailed above by example, and applied to a piezoelectric source by example, to be applied to any acoustical source and to therefore optimally match any acoustical source to any medium or target of interest. In particular, the method may be applied to capacitive as well as magneto-electric devices. It is applicable to loudspeakers, hearing aids, sirens, whistles, musical instruments, that is, to any object that produces a sound wave.

Figure 3:
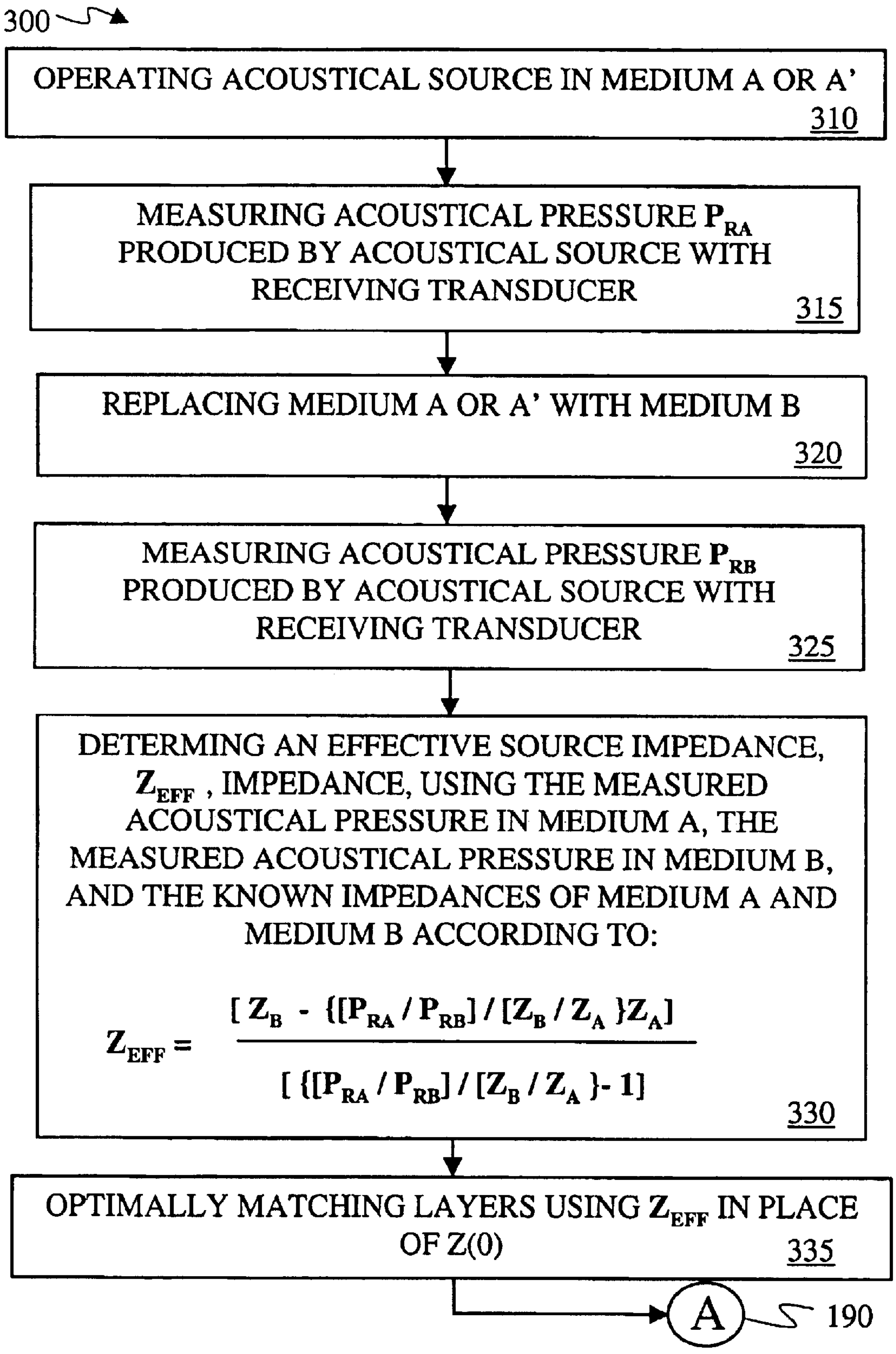
FIG. 3 is a flowchart describing the preferred method for determining an effective source impedance of the present invention.

Described next and in FIG. 3 is a series of experimental measurements by which one determines the effective acoustical impedance for any acoustical source to then be applied to the method of the present invention. Firstly, the source of interest is made to operate 310 in a first medium or the medium of interest, i.e., the target medium, A, or in a medium with similar acoustical properties, A', to that of the target medium. For example, defining $Z_A$ as the acoustical impedance of the medium in which the source is operating, one presumes that the impedance of medium A, $Z_A$, is independently measurable and that the source is not already optimally matched to this target. Using a separate receiving transducer, one measures 315 the acoustical pressure produced by the source of interest at an arbitrary location within the medium A, having impedance $Z_A$. The receiving transducer need not be identical or even similar to the source and it may well operate on very different principles of sound production. It should, of course, operate within a range of frequencies and amplitudes appropriate to the source. The receiving transducer need not be calibrated to measure absolute pressure because relative measures of pressure will suffice. Although the location of the receiver with respect to the source need not be precisely defined, such measurements should follow good acoustical measurement practices and should be undertaken at sufficiently large separation distances so that near-field artifacts, known to practitioners in the field, do not pose a problem in corrupting the measurements.

The pressure amplitude measured by the receiving transducer in medium A, $P_{RA}$, is given by $$P_{RA}=p_0\tau_{0A}=p_0[2Z_A/(Z_{EFF}+Z_A)]; \quad [16]$$

where $p_0$ is the pressure at the source, $\tau_{0A}$ is the transmission coefficient between the source and medium A, and $Z_{EFF}$ is the effective acoustical impedance of the source.

Next one replaces 320 medium A with a second medium, B, which has acoustical properties that are different from A, or A', but are still appropriate for the function of both the acoustical source and the receiving transducer. All other variables are preferably kept constant, e.g. distance between source transducer and receiving transducer remain the same, and then the pressure amplitude is measured 325 at the receiving transducer, $P_{RB}$. The pressure amplitude measured by the receiving transducer in medium B is given by $$P_{RB}=p_0\tau_{0B}=p_0[2Z_B/(Z_{EFF}+Z_B)]; \quad [17]$$

where $\tau_{0B}$ is the transmission coefficient between the source and medium B. While ensuring that the source is operating at the same power levels whether medium A or B is in place, one takes the ratio of the above two equations which yields $$P_{RA}/P_{RB}=[2Z_A/(Z_{EFF}+Z_A)]/[2Z_B/(Z_{EFF}+Z_B)]. \quad [18]$$

Using the following definition for a variable, $\Omega$, $$\Omega[P_{RA}/P_{RB}]/[Z_B/Z_A], \quad [19]$$

one generates 330 the value for ZEFF according to the derived relationship, $$Z_{EFF}=[Z_B-\Omega Z_A]/[\Omega-1]. \quad [20]$$

In the above example, the impedances of materials A and B are known and it is through the process described above that the variable $\Omega$ is obtained empirically. Finally, making the identification that the effective acoustical impedance is the acoustical impedance of the source one can exploit the method described above by the substitution of $Z_{EFF}$ for $Z_0$ 335, that is, $$Z_{EFF}=Z_0 \quad [21]$$

and the method described above and illustrated in FIG. 1 is used to match any acoustical source to the medium or target of operation.

Two examples will illustrate how this experimental method is used to determine the effective acoustical impedance of a given source and how the invention, in its several embodiments, is to be used to optimally match the source to its target material.

The first example is the case where there is a capacitive transducer designed for operation in the ocean, particularly in seawater. Using an identical transducer as a receiver or a piezoelectric transducer operating in a similar frequency range, one measures the pressure amplitude produced by the source in a seawater environment. Then one replaces the seawater with, say, distilled water, and repeats the measurement. These two measurements, together with the known the acoustical properties of seawater and distilled water allow for the determination of an effective acoustical impedance for the capacitive transducer. Finally, using the example method or for calculating appropriately matching layers in making an optimally matched transducer, one selects a series of coatings in terms of impedance and thickness, which, when applied to the source, provides an optimum acoustical match between the transducer and the ocean. As previously explained, this optimal matching, in turn, allows the capacitive transducer to operate at its maximum efficiency.

As a second example, for a loudspeaker designed to operate in air over the frequency range of 5 to 10 kHz, one uses an appropriate microphone to measure the pressure produced by the loudspeaker operating in air. Next, one measures the pressure produced by the loudspeaker operating in an experimental chamber filled with nitrogen gas, for example. These experimental measurements together with the above steps for determining an effective source impedance allows one to select appropriate coatings in terms of im pedance and thickness for optimal acoustical matching, and, therefore, for optimal and efficient performance.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A method of making a transducer having three or more impedance matched layers comprising:

providing a piezoelectric element having a source impedance, $Z_0$;

selecting a target medium having a target impedance, $Z_{(N+1)}$;

defining a number of matching layers, N, wherein N is an integer greater than two; and for each matching layer, J, incremented 1 from three to the defined number of matching layers, N:

determining a required impedance according to:

$$Z_J = Z_0^{[(N+1-J)/(N+1)]} Z_{(N+1)}^{(J/N+1)};$$

selecting a material for matching layer J having substantially the determined required impedance $Z_j$ wherein the selected material for matching layer J has a speed of sound and a wavelength $\lambda_J$ associated with the speed of sound for matching layer J;

determining a positive integer value, $n_j$, and a thickness, $L_j$, of the selected material for matching layer J according to:

$$L_J = (2n_J - 1)\lambda_J/4; \text{ and}$$

applying the matching layer J of thickness $L_j$ to the transducer.

2. A method of making a transducer having a plurality of impedance matched layers comprising:

providing an acoustical source having a derived effective source impedance, $Z_{EFF}$;

selecting a target medium having a target impedance, $Z_{(N+1)}$;

defining a number of matching layers, N, wherein N is an integer greater than unity; and for each matching layer, J, incremented 1 to the defined number of matching layer, N:

determining a required impedance according to:

$$Z_J = Z_{EFF}^{[(N+1-J)/(N+1)]} Z_{(N+1)}^{(J/N+1)};$$

selecting a material for matching layer J having substantially the determined required impedance $Z_J$ wherein the selected material for matching layer J has a speed of sound and a wavelength $\lambda_j$ associated with the speed of sound for matching layer J;

determining a positive integer value, $n_j$, and a thickness, $L_j$, of the selected material for matching layer J according to:

$$L_J = (2n_J - 1)\lambda_J/4; \text{ and}$$

applying the matching layer J of thickness $L_J$ to the transducer.

3. The method of making a transducer having a plurality of impedance matched layers as claimed in claim 2 further comprising:

producing acoustical pressure by an acoustical source in a first medium having an acoustical impedance;

measuring, by a receiving transducer, the acoustical pressure produced by the acoustic source in the first medium;

producing acoustical pressure by the acoustical source in a second medium having an acoustical impedance;

measuring, by the receiving transducer, the acoustical pressure produced by the acoustical source in the second medium; and determining the derived effective source impedance based upon the acoustical impedance of the first medium, the acoustical impedance of the second medium, the acoustical pressure in the first medium measured by the receiving transducer, and the acoustical pressure in the second medium measured by the receiving transducer.

4. The method of making a transducer having a plurality of impedance matched layers as claimed in claim 3 wherein the step of determining the derived effective source impedance, $Z_{EFF}$, is based upon the acoustical impedance of the first medium, $Z_A$, the acoustical impedance of the second medium, $Z_B$, the acoustical pressure in the first medium measured by the receiving transducer, $P_{RA}$, and the acoustical pressure in the second medium measured by the receiving transducer $P_{RB}$, according to the relationship:

$$Z_{EFF} = [Z_B - \{[P_{RA}/P_{RB}]/[Z_B/Z_A]\}Z_A]/[\{[P_{RA}/P_{RB}]/[Z_B/Z_A]\} - 1].$$

5. An apparatus for transmitting acoustical energy to a target medium having a target impedance, the apparatus comprising:

a piezoelectric element having a source impedance, $Z_0$, and three or more matching layers;

wherein each of the three or more matching layers, has a required impedance according to:

$$Z_J = Z_0^{[(N+1-J)/(N+1)]} Z_{(N+1)}^{(J/N+1)};$$

and a wavelength λ and wherein each of the three or more matching layers has a thickness according to:

$$L_J = (2n_J - 1)\lambda_J/4,$$

wherein $n_j$ is a positive integer; and wherein the three or more matching layers is bonded to the piezoelectric element.

6. An article for matching acoustical energy from a source having an impedance, $Z_0$, to a target medium having a target impedance, $Z_{(N+1)}$, the article comprising:

three or more matching layers, N, wherein each of the three or more matching layers, J, has a required impedance, $Z_J$, according to:

$$Z_J = Z_0^{[(N+1-J)/(N+1)]} Z_{(N+1)}^{(J/N+1)};$$

and a wavelength $\lambda_J$.

7. The article as claimed in claim 6 wherein each of the three or more matching layers has a thickness according to:

$$L_J = (2n_J - 1)\lambda_J/4;$$

and wherein $n_J$ is a positive integer.

8. The article as claimed in claim 6 wherein the target medium is air.

* * * * *